United States Patent [19]

Nafziger

[11] 3,927,644

[45] Dec. 23, 1975

[54] ANIMAL WASTE TREATMENT SYSTEM

[76] Inventor: Joel L. Nafziger, R.R. 1, Hopedale, Ill. 61747

[22] Filed: Jan. 3, 1974

[21] Appl. No.: 430,475

[52] U.S. Cl. .................................. 119/16; 210/167
[51] Int. Cl.² ......................................... A01K 1/00
[58] Field of Search ................ 119/16, 1, 27, 28; 210/220, 221, 196, 167, 170, 3, 7, 15

[56] References Cited
UNITED STATES PATENTS

| | | | |
|---|---|---|---|
| 2,081,947 | 6/1937 | McCornack | 119/16 X |
| 3,418,236 | 12/1968 | Mail | 210/221 X |
| 3,556,054 | 1/1971 | Honegger | 119/16 |

Primary Examiner—J. N. Eskovitz
Attorney, Agent, or Firm—Fraser and Bogucki

[57] ABSTRACT

A waste treatment system is provided for a farm animal house in which the animals are maintained on slatted floors beneath which is a water filled ditch into which waste from the animals drops. The mixture of waste and water forms a slurry which is recirculated through the ditch into a tank trap with an aeration device introducing air into the slurry as it flows from the ditch to the trap. A return sump is installed in the trap below the level of the slurry with a return line connecting the return sump to the ditch. Also provided is a combined aerating and agitating pump having an adjustable air vent for establishing an optimum level of aeration of the slurry to minimize the formation of foam while at the same time establishing proper conditions for the growth of bacteria which consumes the waste. The adjustable pump aerator and agitator in combination with the trap cooperate in the present invention to continuously separate sludge from the slurry and substantially eliminate foam buildup within the animal maintenance house.

10 Claims, 7 Drawing Figures

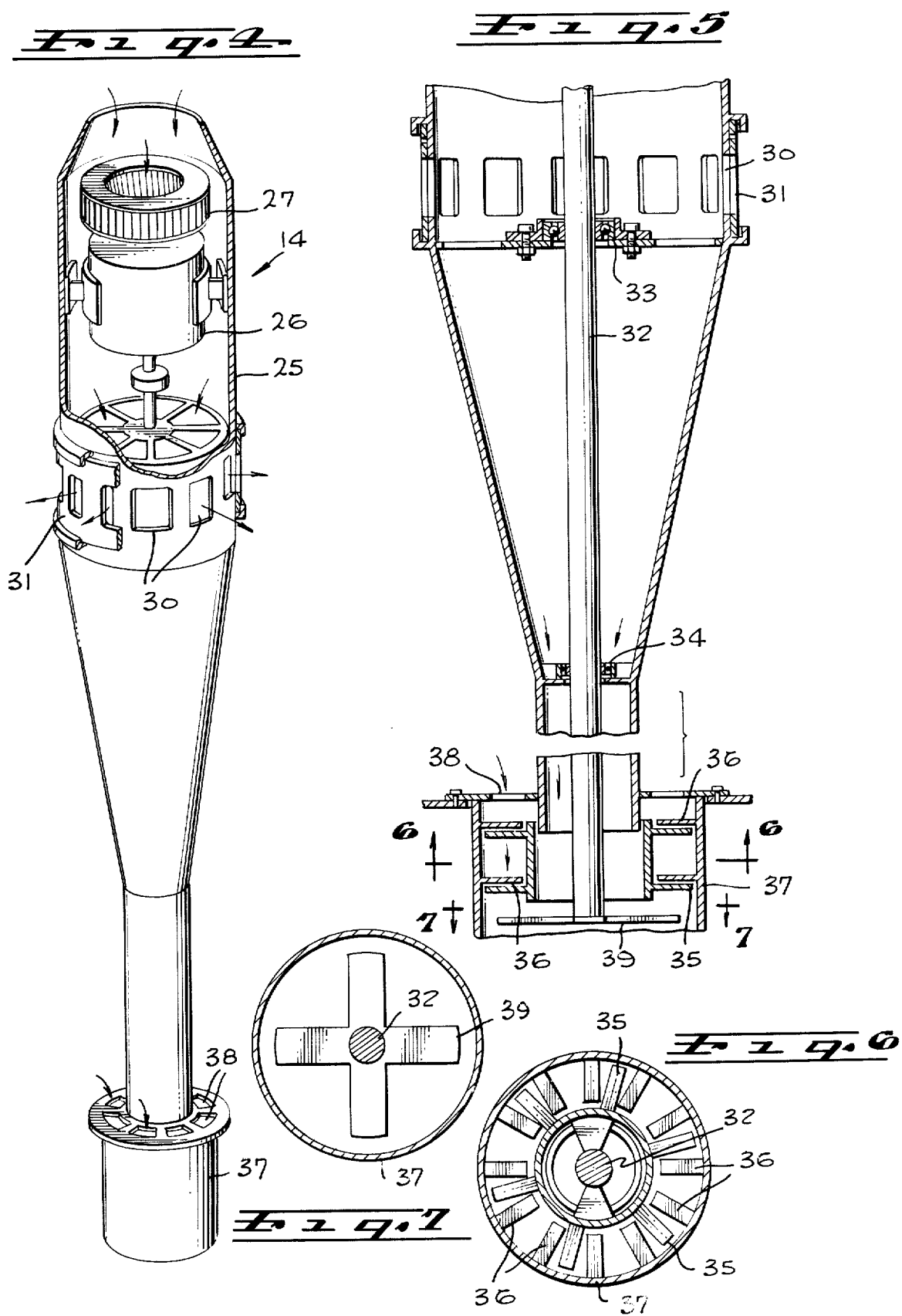

3,927,644

ANIMAL WASTE TREATMENT SYSTEM

BACKGROUND OF THE INVENTION

The present invention relates generally to a waste treatment system for use in connection with an animal maintenance house of the type in which animal waste drops into a water filled ditch. A slurry of the water and waste is recirculated and aerated to encourage the growth of aerobic bacteria which reduces the waste to mainly carbon dioxide and water thereby minimizing the odor associated with the raising of animals such as swine. One prior art patent which discloses a movable animal house having a recirculating water filled ditch which is aerated in U.S. Pat. No. 3,556,054 issued Jan. 19, 1971 to Lyle J. Honnegger et al. In that patent and elsewhere it has been recognized that one of the problems associated with using aerated waste treatment systems is the buildup of foam within the building housing the animals which on occasion may rise above the floor of the animal house, expanding into the animal pens and smothering the animals. Although there have been efforts to destroy the foam through chemical or mechanical means, none have proven reliable in practice. Moreover, another problem associated with oxidation ditches is that they gradually fill with solid material upon which the growth of bacteria has been ineffective so that prior oxidation ditches must be drained to allow the waste to settle and be removed, thereby necessitating the removal of the animals from the maintenance house during the draining and cleaning operation.

SUMMARY OF THE INVENTION

Each of the above-described difficulties inherent in conventional oxidation ditch waste treatment systems is eliminated by the system of the present invention in accordance with which an animal maintenance house is provided having a slatted floor upon which the animals are supported and beneath which is provided a ditch containing a slurry for the removal and treatment of the animal waste. An outlet conduit from the ditch is connected to a trap for receiving the slurry from the ditch and a return sump below the level of the slurry in the trap is connected to a return conduit to the ditch. A pump which performs the dual functions of aeration and agitation draws the slurry from the ditch and pumps it into the trap. The pump has an adjustable air vent so that optimum levels of aeration may be established for the proper oxidation of the animal wastes while minimizing those conditions which would otherwise lead to the production of foam. By means of the return sump below the level of the slurry in the trap any foam which is formed remains on the surface of the slurry in the trap and is not returned to the ditch, thereby eliminating the buildup of foam in the ditch. Also any noxious gases released by the agitating process are carried to the trap by the slurry and released to the air outside of the building. At the same time the sump in the trap is centrally disposed so that by virtue of a certain amount of centrifuge action during the movement of the fluid through the trap sediment concentrates in the bottom of the trap on a continuous basis. Accordingly, from time to time the sediment concentration in the trap may be pumped out as necessary without requiring the draining of the system. A better understanding of the advantages and features of the present invention may be had from a reading of the following detailed description and an inspection of the drawings.

BRIEF DESCRIPTION OF THE DRAWINGS

FIG. 4 is a perspective view of an aerating and agitating pump for use in the waste treatment system of the invention in which the structure has been broken away to illustrate the relationship of the component parts thereof;

FIG. 5 is a half-sectional view of the lower portion of the pump of FIG. 4;

FIG. 6 is a sectional view taken along line 6-6 of FIG. 5; and

FIG. 7 is a sectional view along line 7-7 of FIG. 5.

DETAILED DESCRIPTION OF A PREFERRED EMBODIMENT OF THE INVENTION

Figure 1:
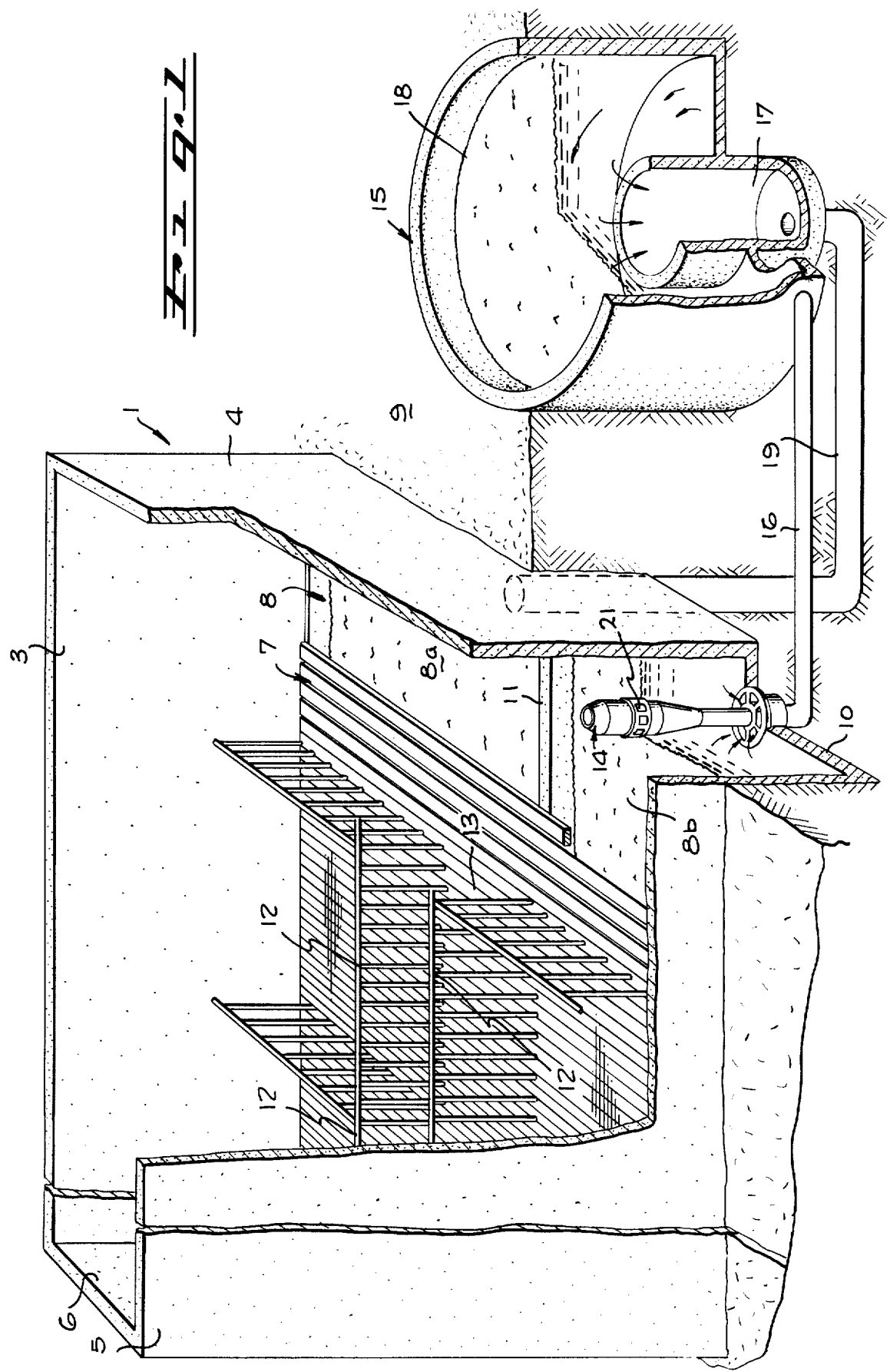
FIG. 1 is a perspective view of a waste treatment system and an associated animal maintenance house in accordance with the present invention in which the structure has been broken away to better illustrate the component parts thereof.
Figure 2:
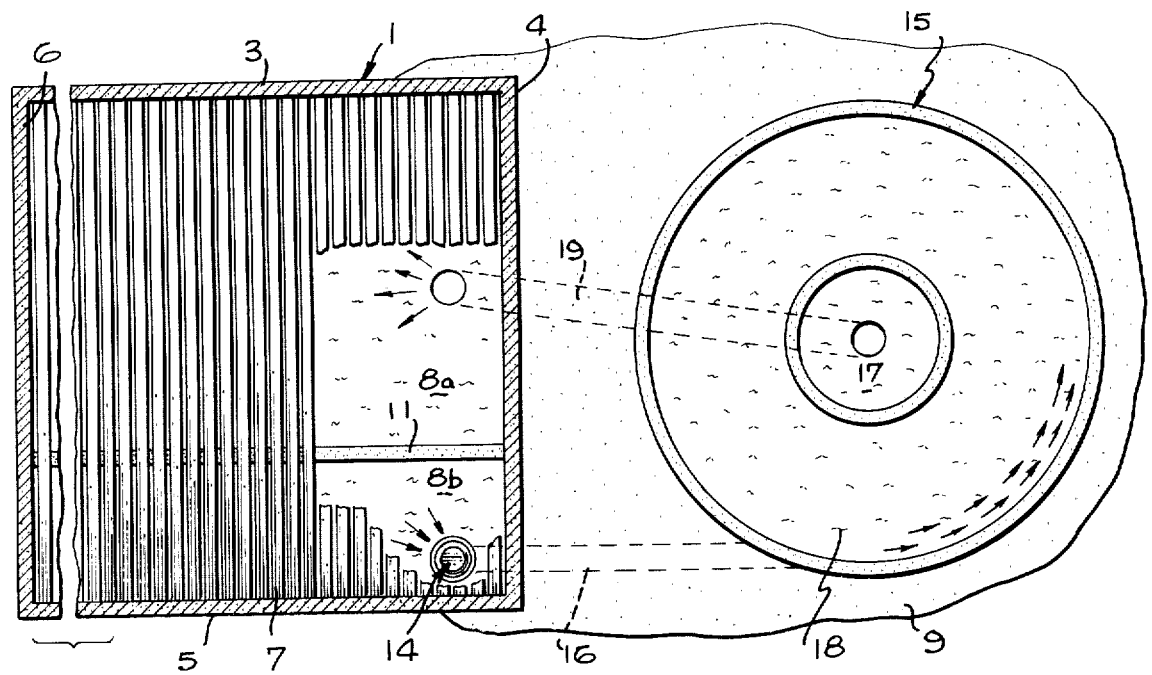
FIG. 2 is a plan view of the waste treatment system of FIG. 1 illustrating the interconnection between the oxidation ditch and the trap.
Figure 3:
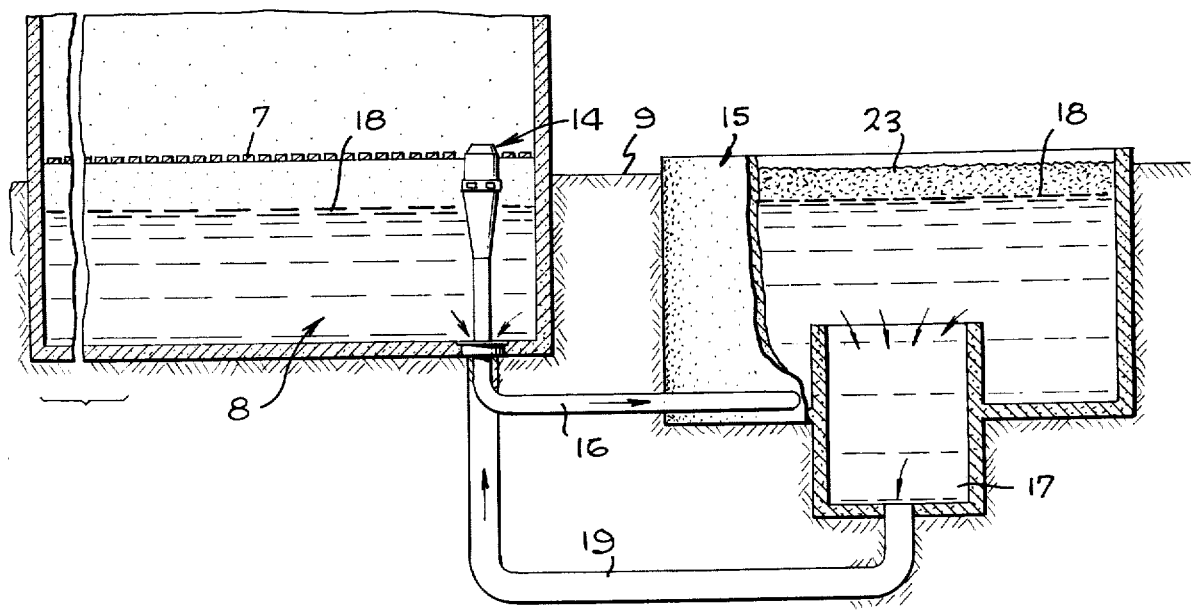
FIG. 3 is an elevation view of the structure shown in FIG. 2.

In FIGS. 2 and 3 there is illustrated an animal waste treatment system along with an animal maintenance house or shelter, the roof of which has been removed. The animal maintenance shelter of FIG. 1 is designated generally by the numeral 1 and comprises a structure of walls 3, 4, 5 and 6 within which there is supported an open floor 7 comprising individual slats in conventional fashion for supporting the animals within the building while providing openings through which the waste from the animals drops by gravity with the occasional aid of water flushing into a ditch 8 which is divided into two portions 8a and 8b along the length of the building 1.

Preferably the building 1 is constructed partially below the level of the ground 9 as shown with the ditch having a concrete floor 10 and a divider 11 running along the length thereof to separate the portions 8a and 8b from each other except at the lefthand end. Individual pens 12 may be constructed on the slatted floor 7 for the maintenance of one or more animals. A walkway 13 is provided along the length of the building for access, entrance and egress of the animals.

At one end of the ditch 8b is installed a pump 14 whose function it is to withdraw from the ditch 8 a slurry comprising the water with which the ditch was originally filled along with the animal waste. The pump 14 performs the functions of moving the slurry, introducing air into the slurry and agitating the slurry upon removal from the ditch 8. The outlet of the pump 14 is connected to a cylindrical trap 15 via a pipe 16. The effluent from the pipe 16 enters the cylindrical trap 15 at its bottom tangentially so that the fluid within the trap 15 tends to have a counterclockwise motion as shown. Centrally disposed in the bottom of the trap 15 is a sump 17, the top of which is substantially below the level of the slurry 18. At the bottom of the sump 17 is an outlet from the trap 15 which is connected to the portion of the ditch 8a via a pipe 19.

In operation, when the pump 14 is functioning the slurry is recirculated in the ditch by withdrawing fluid from the portion of the ditch 8b into the trap 15 where sediment is continuously accumulated on the bottom outside of the sump 17. Although a certain amount of the sediment may be returned to the ditch 8a the process is continuous and very little buildup of sediment in the ditch 8 will take place since substantially all residual solid material will eventually have accumulated in the trap 15. Moreover, due to the motion of the slurry imparted by the position of the pipe 16 tangentially of the inside of the trap 15 and the natural vortex action taking place above the sump 17 a certain amount of centrifugal separation takes place which further enhances the continuous separation of the solid sediment from the slurry within the tank 15. As a result, it has proved to be unnecessary to drain the system for periodic cleaning and removal of the sediment as is required in conventional systems. Rather, it is only necessary to insert the imput line of an auxiliary pump into the trap 15 and to withdraw the accumulated solid wastes.

The positioning of the outlet and inlet pipes and the construction of the return sump within the trap 15 may be best seen in the plan and elevational views of FIGS. 2 and 3 in which like numbers have been employed to indicate the portions of the structure shown and described in connection with FIG. 1. In particular, from an inspection of FIGS. 1-3 it will be seen that the top level of the return sump is substantially below the level of the slurry 18.

The pump 14 which will be described in detail below includes an adjustable air vent 21 whereby the amount of air introduced in the aerating action may be adjusted to achieve an optimum level of oxidation of the accumulated wastes. As is well known, the oxidation of the slurry in connection with the formation of aerobic bacteria breaks down the animal waste products to provide a substantially odor free waste treatment system releasing carbon dioxide and water by organic decomposition. However, in prior known systems utilizing conventional aerating devices, a serious problem arises due to the formation of foam on the surface of the slurry within the ditch 8. In extreme cases the slurry may produce enough foam to rise through the slatted floor 7 until it harms and sometimes suffocates the animals in the pens 12. The pump 14 in cooperation with the particular structure of the trap 15 precludes this possibility in the waste treatment of this invention inasmuch as the return of the fluid to the ditch 8 is taken from substantially below the surface 18 of the slurry, thereby causing the foam from the aeration process to collect on the surface 18 of the slurry in the trap 15. As shown in FIG. 3 the foam 23 is confined in the top of the trap 15 and does not appear on the surface of the slurry 18 in the ditch 8, thereby completely overcoming the serious and damaging problem of foam buildup within the animal maintenance house. Although the trap structure of the invention may be used to advantage with any aerating device, the exceptional results achieved with the use of the special combined agitating and aerating pump forming a portion of the present invention is to be recommended. Accordingly, the structure of the pump 14 shown in FIGS. 4-7 will be described in detail.

The pump 14 comprises a housing 25 which at the upper portion thereof contains an electric motor 26. The upper shaft on the electric motor 26 drives a conventional centrifugal fan 27 which draws air into the top of the pump 14 through the opening as shown. The air flows through the fan 27 traveling downwardly along the sides of the motor to cool it and into the lower portion of the pump housing 25. Immediately below the motor 26 a plurality of vents 30 are cut in the housing 25 surrounded by an adjustable apertured ring 31 which may be turned about the body 25 of the pump 14 to open and close the apertures 30. By this means, the air from the fan 27 may be completely directed to the bottom of the pump 14 or, in the alternative, it may be partially vented to the atmosphere in order to provide the desired amount of aeration of the slurry. The tapered bottom portion of the housing 25 encloses the lower motor shaft 32 which is conventionally journaled in the ball bearings 33 and 34 (FIG. 5). The lower motor shaft 32 drives a plurality of blades 35 which turn with the shaft and interact with fixed vanes 36 mounted on the periphery of the cylindrical agitator housing 37. Further, the shaft drives the blade 39 at its bottom end. In operation, the slurry from the ditch is drawn into the openings 38 at the top of the agitator housing 37 where the slurry is agitated and mixed with the air as the blades 35 and 39 turn. Thus, the fluid forced out of the bottom of the pump has been agitated and aerated. The pump 14 may be installed at the inlet to the pipe 16 at the bottom of the ditch 8b for operation in the system described above in connection with FIGS. 1-3. Electrical connections to the motor 26 must be provided which are suitably shielded for the environment in which the pump operates. The fan 27 and the motor 26 may be purchased as readily available items with the remainder of the structure being fabricated using conventional machine shop techniques and in accordance with this description and FIGS. 4-7.

From the above description of a preferred embodiment of the invention, it is apparent that there is provided a new and improved system for the treatment of animal wastes having the advantages of a controlled level of aeration, the continuous accumulation of sediment in the trap for easy removal without draining the system and the substantial elimination of the accumulation of foam in the ditch beneath the animal maintenance house, thereby for the first time providing a practical and substantially noxious-gas-free arrangement for the maintenance of animals in a healthful and sanitary environment.

Although a particular arrangement and system for the practice of the invention has been shown and described in detail it will be appreciated that the system may be modified and alternative arrangements employed within the scope of the invention as defined in the annexed claims.

What is claimed is:

1. A waste treatment system for use in conjunction with a farm animal maintenance building in which animals are maintained on a floor, comprising the combination of a ditch disposed beneath the floor and operative to contain a slurry for the removal and disposal of animal waste, a trap having a bottom and wall means extending upwardly from the bottom to a selected level, means for introducing the slurry from the ditch into the trap, means for aerating the slurry prior to the introducing of the slurry into the trap to enhance the bacterial destruction of the animal waste, the aerating tending to produce some foam within the slurry, a return sump positioned in the trap below the selected level, and means for returning slurry from the sump to the ditch whereby the slurry is recirculated from the ditch to the trap and returned to the ditch absent any foam created by aeration, the foam remaining in the trap.

2. A waste treatment system in accordance with claim 1 wherein the means for introducing the slurry from the ditch into the trap includes means for separating solids in the slurry from the remainder of the slurry, the solids remaining in the trap and the remainder of the slurry being directed into the return sump.

3. A waste treatment system in accordance with claim 1, wherein the means for introducing the slurry from the ditch into the trap and the means for aerating the slurry include a pump for withdrawing the slurry from the ditch and introducing it into the trap, said pump being adapted to aerate the slurry.

4. A waste treatment system in accordance with claim 3 in which the pump has adjustable means for establishing a desired level of aeration of the slurry.

5. A waste treatment system in accordance with claim 3 in which the pump comprises a motor, a centrifugal fan driven by the motor, a plurality of mixing blades driven by the motor, a housing forming an air conduit surrounding the pump structure, a plurality of adjustable vents in the housing for establishing a desired level of aeration of the slurry, the bottom portion of the housing having a fluid inlet above the blades and a fluid outlet below the blades whereby the slurry is driven through the pump and aerated to a degree providing optimum bacterial action with a minimum foam production.

6. A waste treatment system for use in conjunction with a farm animal maintenance building in which animals are maintained on a floor, comprising the combination of a ditch disposed beneath the floor and operative to contain a slurry for the removal and disposal of animal waste, a trap having a bottom and wall means extending upwardly from the bottom to a selected level, means for introducing slurry from the ditch into the trap, a return sump positioned in the trap below the selected level, and means for returning slurry from the sump to the ditch whereby the slurry is recirculated from the ditch to the trap and returned to the ditch, said return sump including a trap for deposited solids so that a slurry substantially free of foam and solid materials is returned to the ditch.

7. A farm animal building comprising an animal shelter, a floor for supporting the animals, a ditch beneath the floor having a configuration adapted to carry a moving slurry beneath the floor for the purpose of disposing of animal wastes, a pump disposed in the path of the moving slurry for maintaining the slurry in continuous motion, means for aerating the moving slurry to enhance the bacterial destruction of the animal wastes, a sediment trap having a bottom and wall means extending upwardly from the bottom to a selected level, means for carrying the slurry from the ditch to the sediment trap, the sediment trap allowing the settling of solid wastes which are not destroyed by the bacterial action, and means connected between the ditch and the trap for withdrawing fluid from the trap below the selected level and returning the fluid from the trap to the ditch, said means for withdrawing fluid inhibiting the return of foam from the trap to the ditch.

8. A farm animal building in accordance with claim 7 in which the trap comprises a substantially cylindrical tank outside the farm animal building, and the means for carrying the slurry from the ditch to the sediment trap comprises an inlet line connected between the ditch and the trap along the side of the trap to produce a circular motion of the slurry within the trap and thereby separate the solid wastes from the slurry.

9. A farm animal building in accordance with claim 8 including a sump centrally disposed within the trap and the means for withdrawing fluid from the trap below the selected level and returning the fluid from the trap to the ditch comprises a return line from the sump to the ditch beneath the selected level so as to return the slurry to the ditch substantially free of foam and sediment.

10. A farm animal building in accordance with claim 9 in which the pump includes the means for aerating the slurry with the sump being positioned at the outlet from the ditch so as to aerate the slurry as it enters the trap, thereby confining substantially all of the foam which is produced in the aeration process to the trap.

* * * * *

UNITED STATES PATENT AND TRADEMARK OFFICE
CERTIFICATE OF CORRECTION

PATENT NO. : 3,927,644
DATED : December 23, 1975
INVENTOR(S) : Joel L. Nafziger

It is certified that error appears in the above-identified patent and that said Letters Patent are hereby corrected as shown below:

Column 1, line 16, after "aerated" and before "U. S.", "in" should read --is--. Column 2, line 24, after "view" and before "along", insert --taken--. Column 4, line 26, after "shielded" and before "the", "for" should read --from--. Column 6, line 38, after "the" and before "being", "sump" should read --pump--.

Signed and Sealed this thirtieth Day of March 1976

[SEAL]

Attest:

RUTH C. MASON
*Attesting Officer*

C. MARSHALL DANN
*Commissioner of Patents and Trademarks*